United States Patent
Jin et al.

(10) Patent No.: US 8,773,803 B2
(45) Date of Patent: Jul. 8, 2014

(54) REDUCED PLASMON SHIELD-GENERATOR GAP STRUCTURE AND PROCESS

(71) Applicant: Headway Technologies, Inc., Milpitas, CA (US)

(72) Inventors: Xuhui Jin, San Jose, CA (US); Hiroyuki Ito, Sunnyvale, CA (US); Shigeki Tanemura, Sunnyvale, CA (US); Dayu Zhou, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/654,490

(22) Filed: Oct. 18, 2012

(65) Prior Publication Data

US 2014/0112115 A1   Apr. 24, 2014

(51) Int. Cl.
*G11B 5/02*   (2006.01)

(52) U.S. Cl.
USPC .................. 360/59; 369/13.13; 369/13.33

(58) Field of Classification Search
None
See application file for complete search history.

(56) References Cited

U.S. PATENT DOCUMENTS

| | | | |
|---|---|---|---|
| 8,036,069 | B1 | 10/2011 | Jin et al. |
| 8,077,558 | B1 | 12/2011 | Tsutsumi et al. |
| 8,125,857 | B2 | 2/2012 | Tanaka et al. |
| 8,164,986 | B2 | 4/2012 | Aoki et al. |
| 8,233,358 | B2 | 7/2012 | Zhou et al. |
| 8,270,791 | B2 | 9/2012 | Komura et al. |
| 2008/0192376 | A1 | 8/2008 | Tanaka et al. |
| 2013/0258824 | A1* | 10/2013 | Komura et al. ............ 369/13.33 |

* cited by examiner

*Primary Examiner* — Wayne Young
*Assistant Examiner* — Brian Butcher
(74) *Attorney, Agent, or Firm* — Saile Ackerman LLC; Stephen B. Ackerman (57) ABSTRACT

Three structures, and processes for manufacturing them, that improve the performance of a TAMR feature in a magnetic write head are disclosed. This improvement is achieved by making the separation between the edge plasmon generator and the plasmon shield less than the separation between the edge plasmon generator and the optical wave-guide.

19 Claims, 7 Drawing Sheets

REDUCED PLASMON SHIELD-GENERATOR GAP STRUCTURE AND PROCESS

RELATED PATENT APPLICATIONS

U.S. Pat. No. 8,036,069 and US Patent Pub. No. 2010/0315735 are related to this application, are owned by a common Assignee, and are herein incorporated by reference in their entirety.

TECHNICAL FIELD

The disclosed structures and processes relate to ways to improve the performance of a TAMR feature by making the separation between the edge plasmon generator and the plasmon shield less than the separation between the edge plasmon generator and the optical wave-guide.

BACKGROUND

Thermally assisted magnetic recording (TAMR) is expected to be one of the future generation magnetic recording technologies that will enable recording at 1~10 Tb/inch$^2$ data density. TAMR converts optical power into localized heating of the magnetic recording medium to temporarily reduce the field needed to switch the magnetizations of the medium grains. With a sharp temperature gradient alone, or together with the magnetic field gradient when both gradients are aligned correctly, data storage density can be further improved over the current state-of-the-art magnetic recording technology.

A TAMR head usually comprises, in addition to its conventional magnetic recording structure, an optical wave-guide (WG) and a Plasmon generator (PG). The WG serves to guide external laser light to the PG, where the optical mode is coupled to the Plasmon mode of the PG. After being converted to plasmon mode the optical energy then concentrated at the location where heating of the medium is required. When the heating spot is correctly aligned relative to the write field of the magnetic recording structure, TAMR is achieved.

Figure 1A:
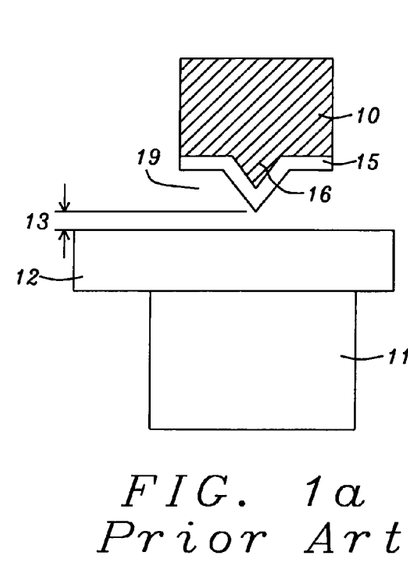
FIGS. 1a and 1b show two views of a TAMR feature of the prior art.

We refer now to the prior art air bearing surface (ABS) view shown in FIG. 1a. This illustrates a TAMR head located at the end of main pole 10, integrated with Edge Plasmon generator (EPG) 15 and having, in cross-section, triangular shape 16. This shaped edge is placed in the vicinity of optical waveguide 11 where it supports the very confined Edge Plasmon (EP) mode. The optical energy in WG 11 is efficiently transformed to edge plasmon mode through evanescent coupling and its energy is directed towards the ABS. The local confinement of the edge plasmon mode is determined by the angle and radius of 16's triangular corner, by the noble metal from which the EPG is formed, as well as by the dielectric material that surrounds tip 16.

Figure 1B:
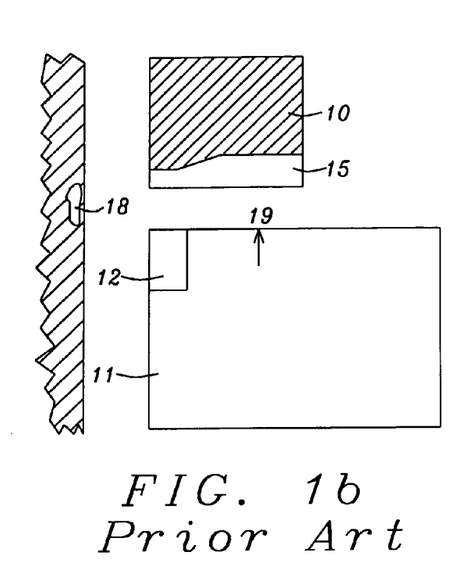

Referring next to FIG. 1b, for a 25 nm tip radius, the size of optical spot 18 in recording medium 9 is about 100 nm across its half-maximum intensity area. By placing plasmon shield 12 a small dielectric gap distance from EPG 15, optical spot 18 can be further reduced in size since, in the presence of plasmon shield 12, the spot size is mainly determined by PSG which is gap distance 13 between edge plasmon generator 15 and plasmon shield 12. For example, a 50 nm optical spot size can be achieved if this gap distance is less than 40 nm.

Plasmon shield 12 is placed at the front of wave-guide 11. Using the current (prior art) process, the top surface of plasmon shield 12 is at the same level as the top surface of WG 11 or even slightly lower than the top surface of WG 11 due to different CMP rates for the Au of layer 15 and the $Ta_2O_5$ used for WG 11.

When PSG 13 is scaled down, WEG 19 (the gap between WG 11 and EPG 15) will also be reduced. One consequence of a reduced WEG is poorer optical coupling efficiency between WG 11 and EPG 15, so some optical power will be wasted as a result. This coupling efficiency cannot be improved by fine turning the length of EPG 15 when WEG 19 is less than 25 nm. Thus, to simultaneously achieve both good optical efficiency and a small optical spot, it is important to have both a large fixed WEG as well as a small PSG.

SUMMARY

It has been an object of at least one embodiment of the present disclosure to simultaneously achieve both good optical efficiency and a small optical spot in a TAMR magnetic write head.

Another object of at least one embodiment of the present disclosure has been to devise a structure in which the gap between the plasmon shield and the plasmon generator is smaller than the gap between the waveguide and the plasmon generator.

Still another object of at least one embodiment of the present disclosure has been to provide a process for manufacturing said structure These objects have been achieved in three different ways:

In the first structure that is disclosed, a triangular indentation is formed in the top surface of the wave-guide so WEG becomes the distance between the floor of this indentation and the edge of the plasmon generator. Since the top surface of the plasmon shield is coplanar with the top surface of the wave-guide, it follows that PSG is smaller than WEG.

In the second structure that is disclosed, the sharp lower edge of the plasmon generator comprises two seamlessly connected parts. The first part is directly above the plasmon shield and is also closer to the plane of the plasmon shield's top surface than the second part is.

In the third structure that is disclosed, there is a 'dummy' a layer of dielectric material on the optical wave-guide's top surface with the plasmon shield located between the dummy layer and the ABS whereby any plasmon radiation propagating towards the ABS through the dummy layer will be blocked;

BRIEF DESCRIPTION OF THE DRAWINGS

FIGS. 3a-8c describe a process for manufacturing this first embodiment of the disclosed structure

DETAILED DESCRIPTION

Figure 2A:
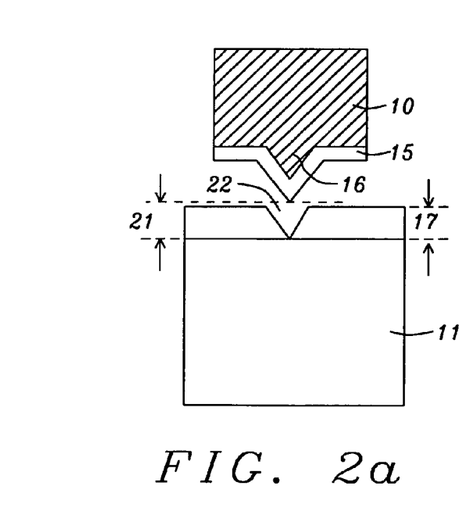
FIGS. 2a-2c illustrate a first embodiment of the disclosed structure

A first embodiment of the disclosed methodology is shown in FIG. 2a that is a cross-sectional view along a plane (see FIG. 2b) formed parallel to the ABS and located behind plasmon shield 12. A first novel feature is how to increase WEG 21. This is achieved by forming indentation 22 which is a trench of triangular cross-section that extends downwards from the top surface of optical wave-guide 11, starting at plasma plasmon shield (PS) 12, and, as seen in the cross-section in FIG. 2b, extending away therefrom for a sufficient distance to a back end 11b to no longer be directly below edge plasmon generator 15. EPG 15 may be made of Au, Ag, Cu, Ru, Ta, Co or alloys thereof. The thickness of PS 12 is 50-200 nm, and its top surface is aligned with the top surface of WG 11. The indentation can also be in other shapes, for example, rectangular or half circular. According to one embodiment, WG 11 has a refractive index from 1.9 to 3.9 and is made of tantalum oxide, SiON, TaSiOx, or Si.

Figure 2B:
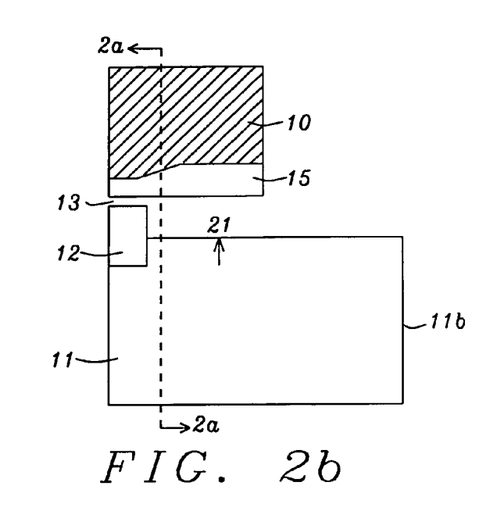

The second novel feature is how to simultaneously decrease PSG 13. This is achieved by allowing PS 12 to extend above the floor of indentation 22, as shown in FIG. 2b. Also apparent from the view given in FIG. 2b is that WEG 21, the physical gap between WG 11 and EPG 15, is larger than PSG 13 (the gap between PS 12 and EPG 15). WEG 21 is kept in the 20-30 nm range to ensure efficient WG to EPG coupling.

Figure 2C:
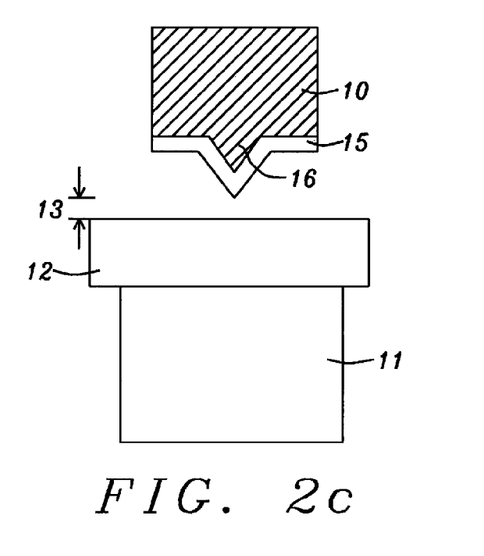

It can be seen in the ABS view in FIG. 2c that plasmon shield 12 is slightly wider than wave-guide 11. If so desired, PS 12 could even be made wide enough to connect with a suitably located heat sink.

Figure 3A:
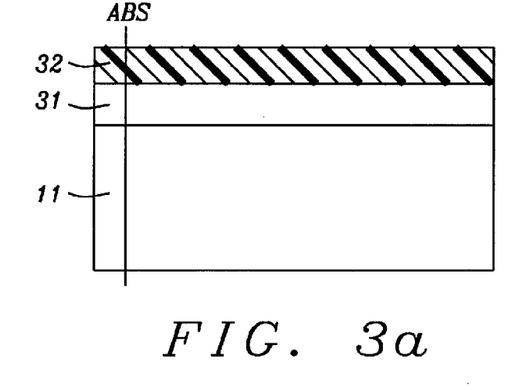
Figure 3B:
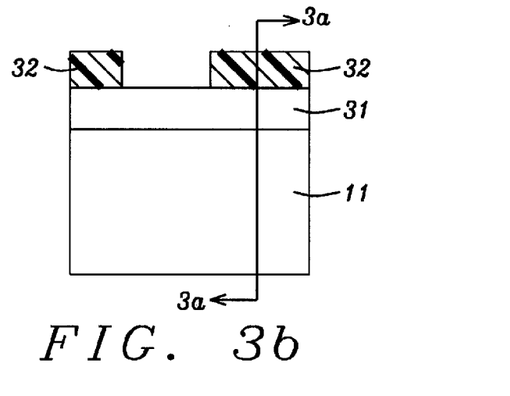
Figure 4A:
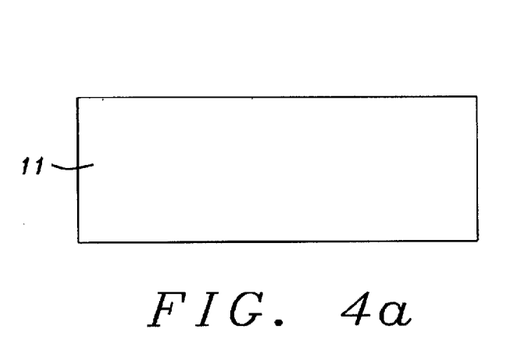
Figure 4B:
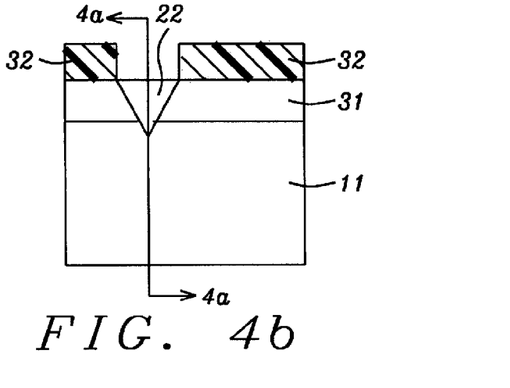

The process to manufacture the first embodiment is as follows:

The process starts, as shown in FIGS. 3a and 3b, with the provision of optical wave-guide 11 onto whose top surface is deposited layer 31 of a low dielectric constant material such as alumina. Photoresist mask 32 is then formed on layer 31, following which, as shown in FIGS. 4a and 4b, triangular indentation 22 is etched all the way through layer 31 as well as an additional short distance (between about 5 and 40 nm) into wave-guide 11.

Control of the latter depth is achieved through over-etching layer 31 using an angled Ion Beam Etching (IBE) for which tantala has a faster etch rate than alumina. Note that FIG. 4a represents a cross-section made through the floor (i.e. apex) of indentation 22 so dielectric layer 31 and photoresist mask 32 do not appear in FIG. 4a even though they are still present in the structure at this point.

Figure 5A:
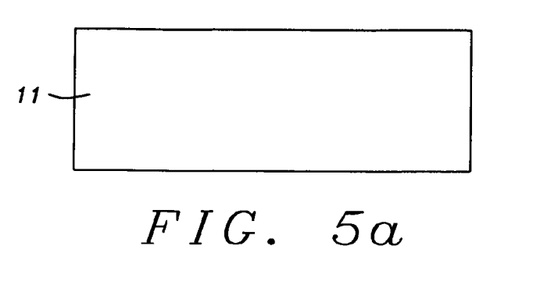
Figure 5B:
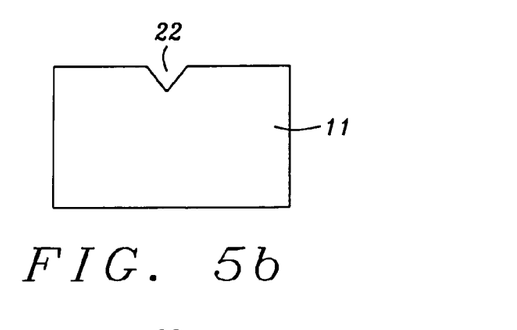

Following the removal of mask 32 and dielectric layer 31, the structure has the appearance shown in FIGS. 5a and 5b.

Figure 6A:
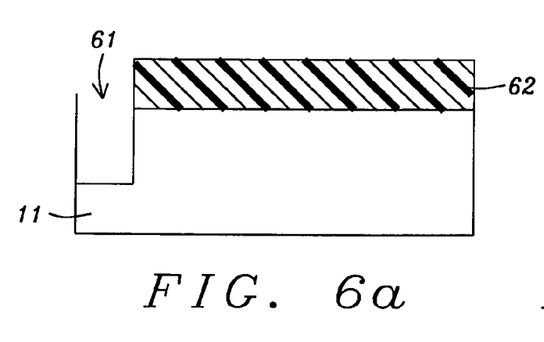
Figure 6B:
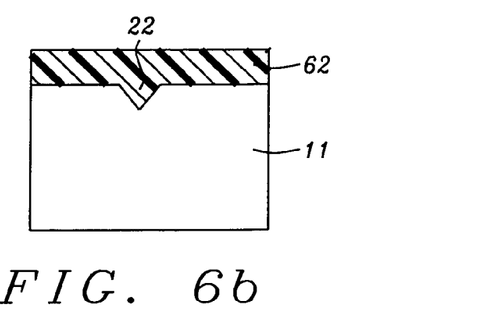

Referring next to FIGS. 6a and 6b, photoresist mask 62 is laid down to define the future location of trench 61 as extending inwards away from the ABS, following which trench 61 is formed by etching wave-guide 11 to a depth of 20 to 500 nm and then leaving photoresist layer in place.

Figure 7A:
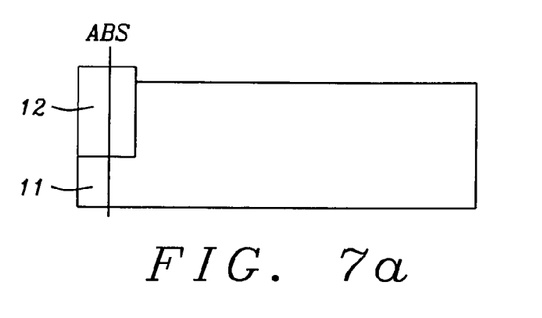
Figure 7B:
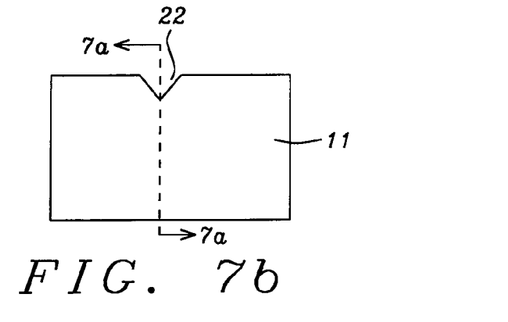
Figure 8A:
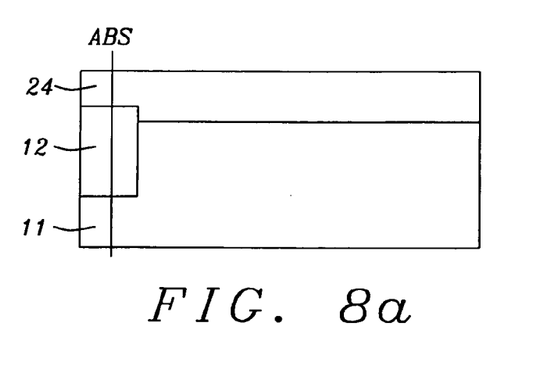
Figure 8B:
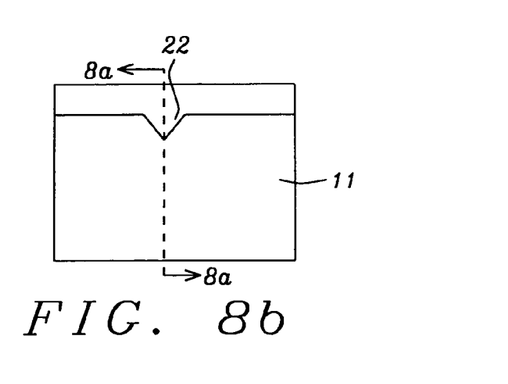
Figure 8C:
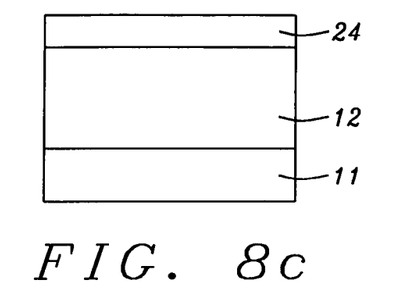

Then, as shown in FIG. 7a, trench 61 is just filled with gold (or other suitable metal (such as Ag, Cu, Ru, Zr, Cr, Ta, Ni, Co, and their alloys), thereby forming plasmon shield 12, and photoresist 62 is lifted off to give the structure the appearance shown in FIGS. 7a and 7b. Finally, as illustrated in FIGS. 8a-8c, layer 24 of alumina is deposited to a thickness that exceeds the height of PS 12 above wave-guide 11's top surface, thereby determining values for both WEG and PSG (designated as gaps 21 and 13, respectively, in earlier figures). FIG. 8c is an ABS view of the completed structure before processing the EPG.

Figure 9:
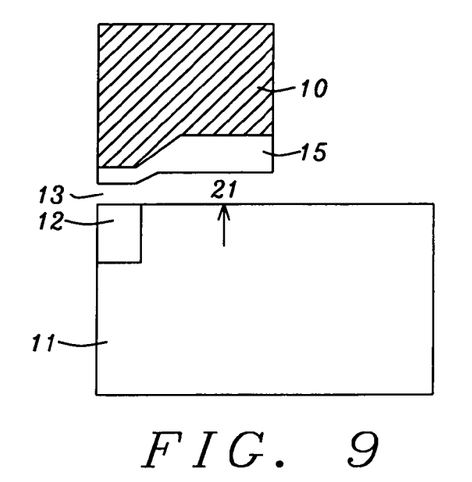
FIG. 9 shows a second embodiment of the disclosed structure FIGS. 10a-13b describe a process for manufacturing this second embodiment of the disclosed structure

In a second embodiment, in the region directly over the plasmon shield, the EPG lower edge is selectively brought closer to the plasmon shield, as shown in FIG. 9 while the remainder of the EPG's bottom surface is left at its normal level of higher than the tip portion, whereby WEG 21 becomes larger than PSG 13. The top surface of PS 12 is at the same level as the top surface of the WG in this case.

Figure 10A:
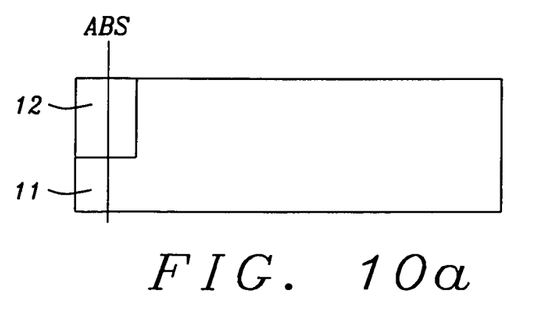
Figure 10B:
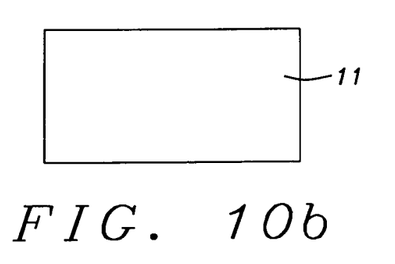

Referring now to FIGS. 10a and 10b the process for the second embodiment begins with the provision of optical wave-guide 11 Then, at wave-guide 11's ABS end, plasmon shield 12 is formed, as described earlier for the first embodiment (see FIGS. 6a to 8b) but with the CMP step continued until the top surface of PS 12 is coplanar with the top surface of WG 11.

Figures 11A, 11B:
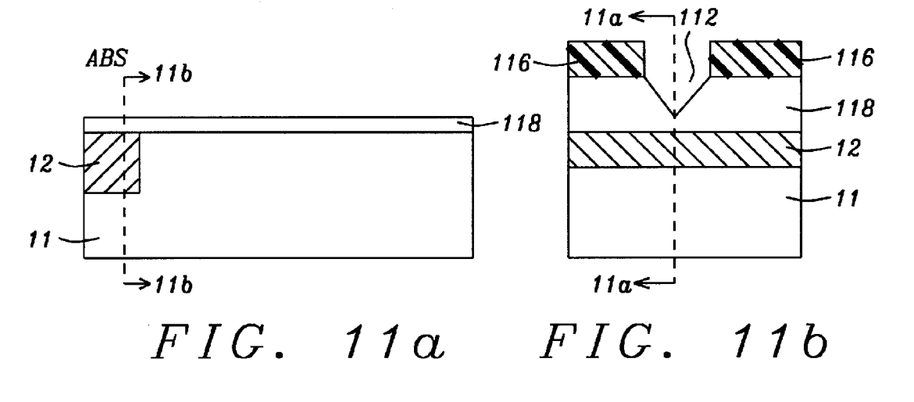

Following the deposition of alumina layer 118 on the top surface of wave-guide 11, photoresist mask 116 is formed on layer 118 and cavity 112 is formed by under-etching layer 118 with mask 116 so that the floor of cavity 112 is located a distance above the top surface of wave-guide 11, as shown in FIG. 11b.

Figure 12A:
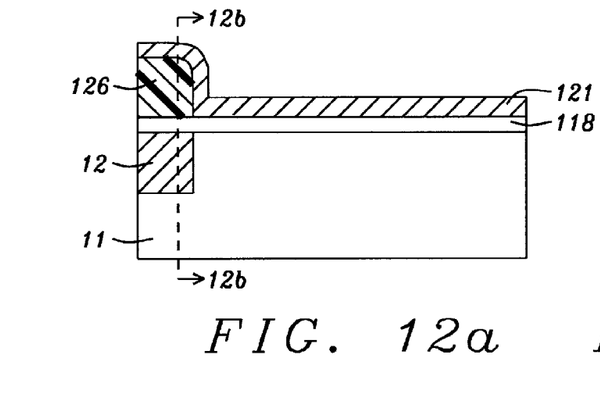
Figure 12B:
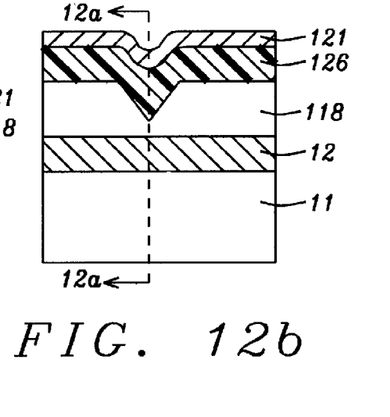
Figure 13A:
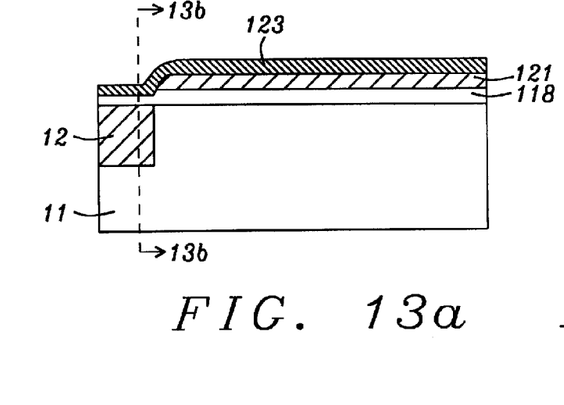
Figure 13B:
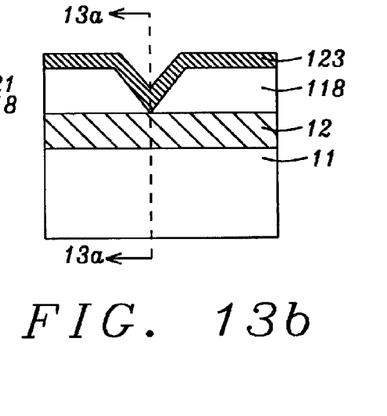

Referring next to FIGS. 12a and 12b, after protecting the area immediately above PS 12 with photoresist mask 126, first gold layer 121 is laid down to a thickness in the range of from 20 to 80 nm Following the removal of photoresist 126, second gold layer 123 is laid down to a thickness in the range of from 5 to 50 nm, giving the structure the appearance shown in FIGS. 9, 13a, and 13b.

Figure 14A:
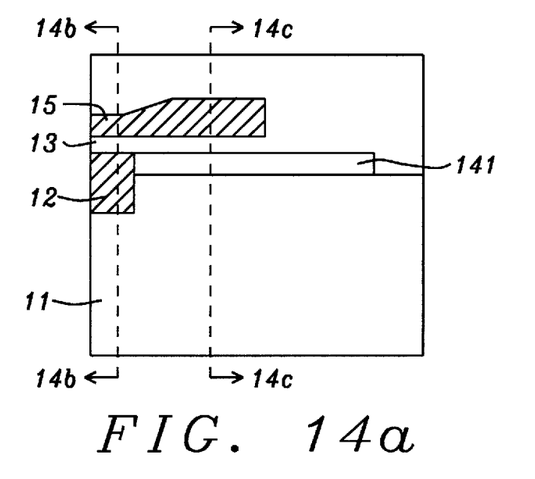
FIGS. 14a-14c show a third embodiment of the disclosed structure FIGS. 15-17 describe a process for manufacturing this third embodiment of the disclosed structure
Figure 14B:
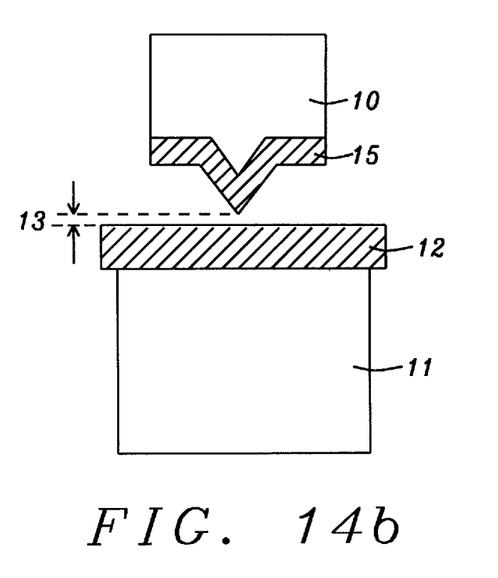
Figure 14C:
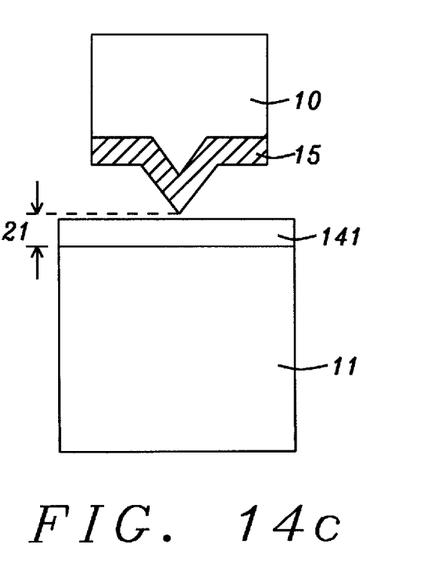

In a third embodiment, a blocked layer is used to reduce PSG while leaving WEG unchanged. This is illustrated in FIGS. 14a-c. FIG. 14a shows dielectric layer 141 inside which plasmon radiation will have been induced by edge plasmon generator 15 (see FIG. 1) but which is unable to reach the recording medium since it is blocked by PS 12. FIG. 14b is a cross-section through WG 11 made some distance away from PS 12 while FIG. 14c is a cross-section through WG 11 made at the intersection of PS 12 with blocked layer 141. Note that blocked layer 141 is made of a low dielectric constant material such as silica or alumina, and its refractive index should be lower than that of WG 11.

Figure 15:
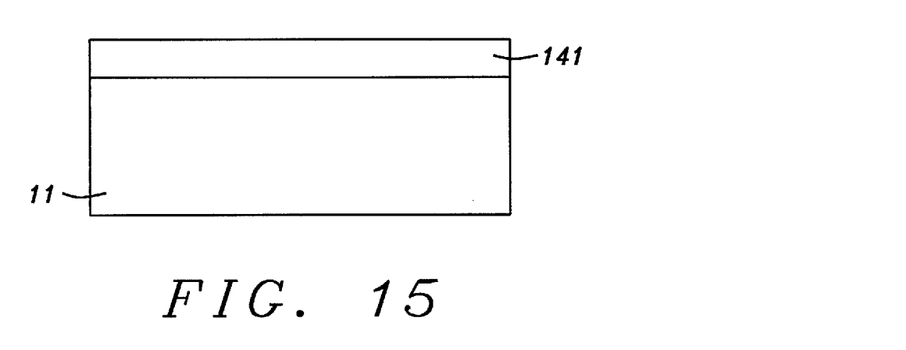
Figure 16:
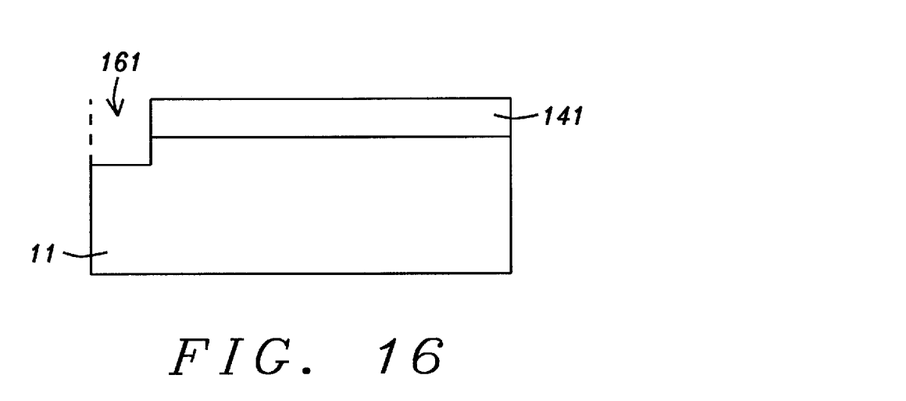
Figure 17:
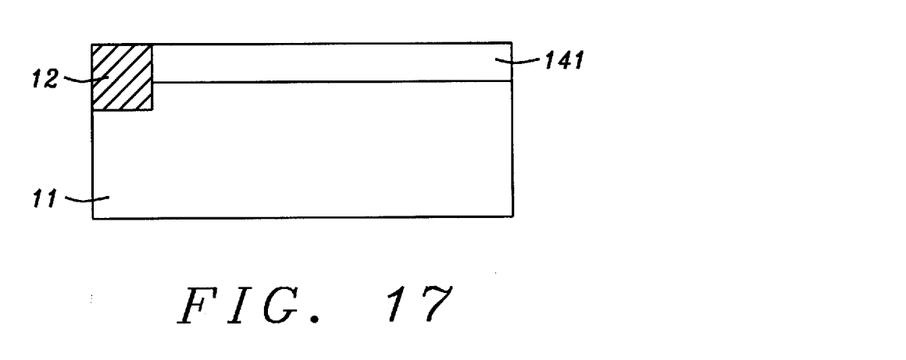

As illustrated in FIG. 15, the process for manufacturing the blocked layer begins with the deposition of layer 141 on the top surface of WG 11. Layer 141 should have a thickness in a range of 5 to 25 nm with a thickness in a range of 10 to 20 nm being preferred. Next, as shown in FIG. 16, trench 161 is formed at the ABS end of WG 11. Finally, following the deposition of sufficient gold to fill trench 161, the structure is planarized to remove all gold outside trench 161, giving the completed structure illustrated in FIG. 17 which shows the top surface of PS 12 to be at the same level as the top surface of blocked layer 141.

The advantages of the reduced Plasmon shield gap structures and processes include:
1. The ability to reduce and shape the optical spot, thereby reducing the size of the thermal spot in the recording medium, resulting in a higher thermal gradient which achieves narrower track, higher BPI and greater areal density;
2. A larger wave-guide to Plasmon Generator gap together with a smaller Plasmon Shield to Plasmon Generator gap whereby there is minimal loss in optical efficiency;
3. The processes that have been disclosed for the manufacture these structures are simple to achieve as well as being suitable for mass production.

What is claimed is:
1. A process to manufacture a thermal assistance feature, having good optical efficiency when generating a small thermal spot, for a magnetic write head having an air bearing surface (ABS) and a main pole with a sharp lower edge made of a first metal, comprising:
providing an optical wave-guide having a refractive index in a range from 1.9 to 3.9 as well as a top surface;

depositing a first layer of material on said top surface, said first layer having a low dielectric constant;

through a mask, etching through said first layer to a level below said wave-guide top surface;

removing said mask and said first layer of material thereby forming a triangular indentation in said top surface to a depth of between 5 and 40 nm, said triangular indentation extending along said top surface directly below said sharp lower edge made of a first metal and terminating at a point that is a distance from said ABS;

to a depth that exceeds that of said triangular indentation, forming in said wave-guide top surface a trench located between said termination point and said ABS and abutting said triangular indentation;

over-filling said trench with a second metal and then planarizing to form a filled trench until a top surface of said filled trench is coplanar with said wave-guide top surface, thereby forming a plasmon shield (PS) and a plasmon shield gap (PSG) between said PS and said main pole's sharp lower edge; and positioning said main pole so that the sharp lower edge lies above said wave-guide top surface to form a wave-guide edge plasmon gap (WEG) that is larger than said PSG, thereby achieving both good optical efficiency and a small optical spot.

2. The process recited in claim 1 wherein said wave-guide is selected from the group consisting of tantalum oxide, SiON, TaSiOx and Si.

3. The process recited in claim 1 wherein said first and second metals are selected from the group consisting of gold, silver, copper, Ru, Ta, Co and their alloys.

4. The process recited in claim 1 wherein the step of etching through said first layer to a level below said wave-guide top surface further comprises using Ion Beam Etching.

5. A process to manufacture a thermal assistance feature, having good optical efficiency when generating a small thermal spot, for a magnetic write head having an air bearing surface (ABS) and a main pole with a sharp lower edge made of a first metal, comprising:

providing an optical wave-guide having a refractive index in a range from 1.9 to 3.9 as well as a top surface;

forming, in said top surface, a trench that abuts the ABS, extending away therefrom for a distance that is in a range from 50 to 200 nm;

over-filling said trench with a second metal and then planarizing until a top surface of said second metal is coplanar with said wave-guide top surface, thereby forming a plasmon shield;

depositing a layer of dielectric material on said top surface, including said plasmon shield;

then, through a first mask, etching said layer of dielectric material to form, in an area directly above said plasmon shield, a triangular indentation in said layer of dielectric material to a depth of between 5 and 40 nm, said depth being insufficient for said triangular indentation to penetrate said top surface, said triangular indentation running along said top surface as far as said ABS;

after removing said first mask, forming a second mask that covers said layer of dielectric material only directly above said plasmon shield;

then depositing a first layer of said second metal to a thickness in a range of from 20 to 100 nm, thereby forming part of said main pole sharp lower edge as well as a wave-guide edge plasmon gap (WEG) equal to said dielectric layer's thickness;

then lifting off said second mask thereby exposing said triangular indentation in an area directly above said plasmon shield; and depositing a second layer of said first metal to a thickness that is sufficient to fully coat said triangular indentation, thereby completing formation of said main pole sharp lower edge and a plasmon shield gap (PSG) that is smaller than said WEG, thereby achieving both good optical efficiency and a small optical spot.

6. The process recited in claim 5 wherein said wave-guide is selected from the group consisting of tantalum oxide, SiON, TaSiOx, and Si.

7. The process recited in claim 5 wherein said first and second metals are selected from the group consisting of gold, silver, copper, Ru, Ta, Co and their alloys.

8. A process to manufacture a thermal assistance feature, having good optical efficiency when generating a small thermal spot, for a magnetic write head having an air bearing surface (ABS) and a main pole with a sharp lower edge made of a first metal, comprising:

providing an optical wave-guide having a refractive index in a range from 1.9 to 3.9, and a top surface;

depositing on said top surface a first dielectric layer having a first thickness, and a refractive index that is less than that of said wave-guide;

to a depth that exceeds said first thickness, forming a trench that abuts said ABS and extends away therefrom;

over-filling said trench with said first metal and then planarizing to form a filled trench whose a top surface is coplanar with a top surface of said first dielectric layer, thereby forming a plasmon shield and ensuring that any radiation propagating towards the ABS through said first dielectric layer will be blocked; and positioning said main pole so that there is a wave guide edge plasmon gap (WEG) between said sharp lower edge and said top surface of said wave-guide as well as a plasmon shield gap (PSG) between said sharp lower edge and a top surface of said first dielectric layer, whereby WEG is larger than PSG, thereby achieving both good optical efficiency and a small optical spot.

9. The process recited in claim 8 wherein said wave-guide is selected from the group consisting of tantalum oxide, SiON, TaSiOx, and Si.

10. The process recited in claim 8 wherein said first and second metals are selected from the group consisting of gold, silver, copper, Ru, Ta, Co and their alloys.

11. A thermal assistance feature, having good optical efficiency when generating a small thermal spot, for a magnetic write head having an air bearing surface (ABS) and a main pole with a sharp lower edge made of a first metal, comprising:

an optical wave-guide having a first refractive index in a range from 1.9 to 3.9 as well as a top surface;

a triangular indentation in said top surface, said triangular indentation having a floor that is between 5 and 40 nm below said top surface and extending along said top surface directly below said main pole sharp lower edge, terminating at a point that is a distance from said ABS; and a plasmon shield (PS), made of a second metal, that abuts said triangular indentation and that is located between said triangular indentation and said ABS;

said PS having a topmost surface that is coplanar with said wave-guide top surface whereby there is a plasmon shield gap (PSG) located between said PS and said main pole's sharp lower edge;

said PS having a bottom-most surface whose depth is below that of said triangular indentation's floor;

said main pole being positioned so that said sharp lower edge lies above said wave-guide top surface whereby there is a wave-guide edge plasmon gap (WEG) that is larger than said PSG, thereby achieving both good optical efficiency and a small optical spot.

12. The thermal assistance feature described in claim 11 wherein said wave-guide is selected from the group consisting of tantalum oxide, SiON, TaSiOx, and Si.

13. The thermal assistance feature described in claim 11 wherein said first and second metals are selected from the group consisting of gold, silver, copper, Ru, Ta, Co, and their alloys.

14. A thermal assistance feature, having good optical efficiency when generating a small thermal spot, for a magnetic write head having an air bearing surface (ABS) and a main pole with a sharp lower edge made of a first metal, comprising:

an optical wave-guide having a refractive index in a range from 1.9 to 3.9 as well as a first top surface;

on said first top surface, a plasmon shield formed from a second metal and located between said ABS and a point that is a distance from said ABS;

said plasmon shield having a second top surface that is coplanar with said wave-guide first top surface;

said main pole sharp lower edge comprising first and second parts seamlessly connected to one another, only said first part being directly above said plasmon shield as well as being closer than said second part to said plasmon shield's second top surface, whereby there is both a plasmon shield gap (PSG) and a wave-guide edge plasmon gap (WEG), with said PSG being smaller than said WEG, whereby said thermal assistance feature has good optical efficiency when generating a small thermal spot.

15. The thermal assist feature described in claim 14 wherein said wave-guide is selected from the group consisting of tantalum oxide, SiON, TaSiOx and Si.

16. The thermal assist feature described in claim 14 wherein said first and second metals are selected from the group consisting of gold, silver, copper, Ru, Ta, Co and their alloys.

17. A thermal assistance feature, having good optical efficiency when generating a small thermal spot, for a magnetic write head having an air bearing surface (ABS) and a main pole with a sharp lower edge made of a first metal, comprising:

an optical wave-guide having a refractive index in a range from 1.9 to 3.9 as well as a first top surface;

on said first top surface, a layer of dielectric material, having a second top surface, beginning at a distance from said ABS and extending away therefrom; and a plasmon shield formed from a second metal and located between said ABS and said layer of dielectric material;

said plasmon shield having a third top surface that is coplanar with said second top surface of said dielectric layer whereby any plasmon radiation propagating towards the ABS through said dielectric layer will be blocked;

said main pole being positioned so that there is a wave guide edge plasmon gap (WEG) between said sharp lower edge and said top surface of said wave-guide as well as a plasmon shield gap (PSG) between said sharp lower edge and said second top surface of said first dielectric layer, whereby WEG is larger than PSG and said thermal assistance feature has good optical efficiency when generating a small thermal spot.

18. The thermal assist feature described in claim 17 wherein said wave-guide is selected from the group consisting of tantalum oxide, SiON, TaSiOx, and Si.

19. The thermal assist feature described in claim 17 wherein said first and second metals are selected from the group consisting of gold, silver, copper, Ru, Ta, Co and their alloys.

* * * * *